United States Patent [19]

Shimizu et al.

[11] 4,392,752
[45] Jul. 12, 1983

[54] OIL SEAL FOR BEARINGS OF TURBOCHARGER

[75] Inventors: Masami Shimizu, Chiba; Junji Yasunobe, Okuwa, both of Japan

[73] Assignee: Ishikawajima-Harima Jukogyo Kabushiki Kaisha, Tokyo, Japan

[21] Appl. No.: 290,700

[22] Filed: Aug. 6, 1981

[30] Foreign Application Priority Data

Aug. 19, 1980 [JP] Japan .................. 55-117288[U]

[51] Int. Cl.³ .................................. F16C 33/74
[52] U.S. Cl. ........................................ 384/135
[58] Field of Search ............... 308/36.4, 187.1, 187.2, 308/36.1, 187, 37, 135; 415/170 R; 384/135, 136

[56] References Cited

U.S. PATENT DOCUMENTS 3,241,842  3/1966  Schweiger ............... 308/36.4
3,292,847  12/1966  Herrick .................. 308/36.4
3,847,455  11/1974  Vandermeulen ........... 308/187.1

Primary Examiner—Lenard A. Footland
Attorney, Agent, or Firm—Scrivener, Clarke, Scrivener and Johnson

[57] ABSTRACT

An oil seal for bearing of turbocharger is constructed so as to have an excellent sealing effect in which a lubricating oil flowing through the oil seal is subjected to the centrifugal force in such a way that the lubricating oil is forced to return toward a lubricating oil chamber.

1 Claim, 4 Drawing Figures

OIL SEAL FOR BEARINGS OF TURBOCHARGER

BACKGROUND OF THE INVENTION

Prior to the description of the present invention, the constructions of bearings supporting a common rotating shaft of a prior art turbocharger will be described.

Referring to FIG. 1, a turbocharger 1 comprises in general a turbine casing 3 disposed on one (left) side of a bearing casing 2 and a blower casing 4 disposed on the other (right) side of the bearing casing 2. A turbine wheel 5 in the turbine casing 3 and a blower impeller 6 in the blower casing 4 are interconnected by a common rotating shaft 7 which in turn is rotatably supported by bearings 8 in the bearing casing 2. The bearing casing 2 has a lubricating oil chamber 9 through which flows a lubricating oil which lubricates the rotating shaft 7 and the bearings 8.

An oil seal 12 as shown in FIG. 2 is disposed in each of clearances 10 and 11 between the bearing casing 2 and the rotating shaft 7, thereby preventing the leakage of the lubricating oil to the exterior of the lubricating oil chamber 9.

The oil seal 12 comprises seal plates 13 and 13a, an oil thrower or slinger 14 and seal rings 15 and 15a. The seal plates 13 and 13a are securely joined to the end face 16 of the bearing casing 2 so as to surround the common rotating shaft 7 and the oil thrower or slinger 14 is disposed in the clearance between the rotating shaft 7 and the seal plates 13 and 13a. The seal rings 15 and 15a are disposed in the clearance between the sealing plates 13 and 13a and the oil thrower or slinger 14.

The oil thrower or slinger 14 is snugly fitted over the rotating shaft 7 for rotation in unison therewith. As it rotates, it attains the "slinger" effect; that is, its flange portion 14' slings the surrounding lubricating oil in the radially outward direction; so that the lubricating oil is prevented from flowing toward the seal rings 15 and 15a.

The seal rings 15 and 15a serve to prevent the lubricating oil from flowing through the clearances between the seal plates 13 and 13a on the one hand and the oil thrower or slinger 14. The rotation at high speeds of the blower impeller 6 results in the generation of a highly negative pressure in the blower casing 4 so that the lubricating oil in the chamber 9 is forcibly drawn into the blower chamber 4 through the clearances between the seal plates 13 and 13a and the oil thrower or slinger 14. Thus, the prior art oil seal has the problem that the leakage of the lubricating oil into the blower casing 4 cannot be satisfactorily prevented with the oil thrower or slinger 14 and the seal rings 15 and 15a. Leakage of lubricating oil is pronounced especially when the rotational speed of the common shaft 7 is so slow that the "slinger" effect is less.

In view of the above, the present invention has for its object to provide an oil seal for bearings of a turbocharger which can effectively prevent the leakage of a lubricating oil from a lubricating oil chamber into a blower casing and a turbine casing, especially to the former, regardless of the rotational speed of a common rotating shaft of the turbocharger.

The present invention will become more apparent from the following description of a preferred embodiment thereof taken in conjunction with the accompanying drawings.

DETAILED DESCRIPTION OF THE PREFERRED EMBODIMENT

Figure 1:
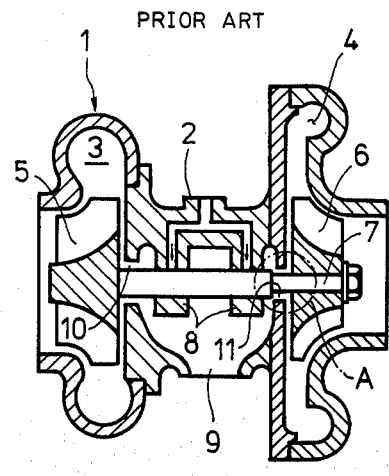
FIG. 1 is a sectional view of a prior art turbocharger.
Figure 2:
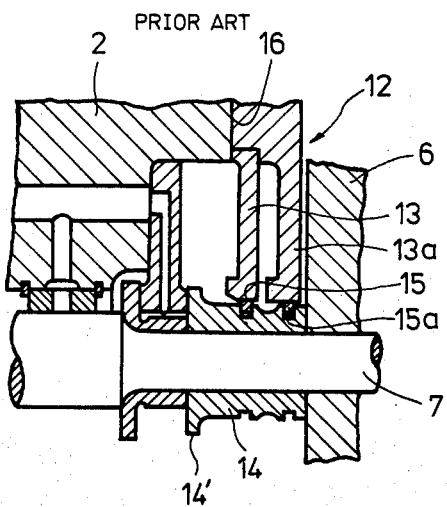
FIG. 2 is a fragmentary sectional view, on enlarged scale, illustrating the portion encircled by a circle A in FIG. 1.
Figure 3:
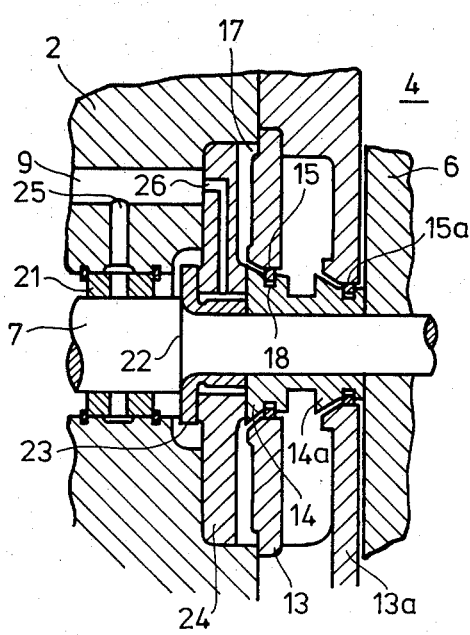
FIG. 3 is a sectional view showing an oil seal in accordance with the present invention.

Referring to FIG. 3, an annular oil thrower or slinger 14 is securely fitted over the common rotating shaft 7 so as to close the clearances between the seal plates 13 and 13a and the rotating shaft 7. The seal plate 13 covers the opening 17 at the right end of the bearing casing 2 and defines the lubricating oil chamber 9.

The seal ring 15 is interposed between the oil thrower or slinger 14 and the seal plate 13 and supported by the latter. More specifically, the seal ring 15 is fitted into an annular groove 18 formed in the peripheral surface of the oil thrower or slinger 14 so that the axial movement of the seal ring 15 is prevented.

Figure 4:
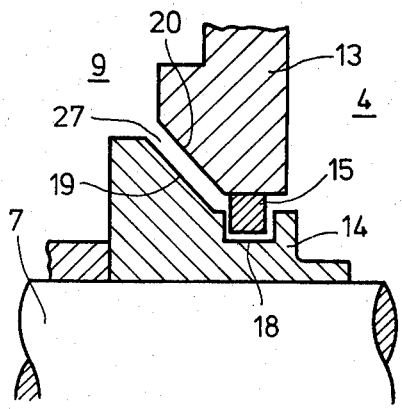
FIG. 4 is a fragmentary sectional view thereof, on enlarged scale, showing some major components thereof.

One of the most important structural distinctions or features of the present invention resides in the fact that, as best shown in FIG. 4, the opposing surfaces 19 and 20 of the oil thrower or slinger 14 and the seal plate 13, respectively are tapered outwardly; and downwardly and in parallel with each other so that a frustoconical space 27 is defined between them.

The oil seal described above is of the one-stage type, but it is to be understood that the oil seals may be arranged in two stages as will be described below. That is, another oil thrower or slinger 14a, which may be formed integral with the oil thrower or slinger 14 as shown in FIG. 3 is securely fitted so as to close the clearance between the rotating shaft 7 and the oil seal plate 13a between the inner oil thrower or slinger 14 and the blower casing 6. The second seal plate 13a is attached to the bearing casing 2 so as to enclose the first seal plate 13. A second seal ring 15a is interposed between the second oil thrower or slinger 14a and the second seal plate 13a. It is apparent to those skilled in the art that the oil seal stages are further extended in a manner substantially similar to that described above.

The rotating shaft 7 is supported in; the bearing casing 2 by floating metals 21 and stepped at 22 to the reduced-diameter portion. The stepped portion 22 of the shaft 7, a thrust bushing 23 fitted over the shaft 7 in such a way that its flange portion is abutted against the stepped portion 22 and a thrust metal 24 with a center hole into which is fitted the thrust bushing 23, constitute a thrust bearing. The floating metals 21 are lubricated and cooled by the lubricating oil supplied through an oil passage 25 while the thrust bushing 23 and the thrust metal 24 are lubricated and cooled by the oil supplied through an oil passage 26.

An oil seal arrangement substantially similar in construction to that described above with reference to FIGS. 3 and 4 may be equally provided between the bearing casing 2 and the turbine casing 3.

Next the mode of operation of the oil seal in accordance with the present invention will be described. The exhaust gases passing through the turbine casing 3 causes the rotation of the turbine wheel 5 and hence the rotating shaft 7 and consequently the blower impeller 6, whereby the air is compressed and charged into the cylinders of an internal combustion engine (not shown). The rotation of the blower impeller 6 results in the generation of a high negative pressure in the blower casing 4 so that after leaving the floating metals 21 and the thrust metal 24, the lubricating oil is forced to flow into the frustoconical space 27 between the first seal plate 13 and the first oil thrower or slinger 14 and further through the clearance between the seal ring 15 and the oil thrower or slinger 14 into the blower casing 4. However, the leaking lubricating oil is subjected to the centrifugal force produced by the rotation of the oil thrower or slinger 14 so that the lubricating oil is forced to return to the lubricating oil chamber 9 by the component of the centrifugal force with acts along the tapered surface 19 of the oil thrower or slinger 14. That is the lubricating oil is subjected to the "slinger effect" which is in proportion to the rotational speed of the shaft 7. That is, the higher the rotational speed of the shaft, the stronger the "slinger effect" becomes.

If the rotational speed of the shaft 7 is so slow that the satisfactory "slinger effect" is not attained and consequently the lubricating oil flows into the space 27, the oil is prevented from flowing out of the space 27 toward the blower casing 4 because of the narrowness of the space 27. That is, the frustoconical space 27 functions as a restriction or throttle.

The lubricating oil which overcomes the "slinger effect" and the restriction or throttling effect and tends to further flow toward the blower casing 4 is prevented by the seal ring 15. That is, the lubricating oil is prevented from leaking by the labyrinth seal effect.

In summary, when the rotating shaft 7 is rotating at high speeds, the lubricating oil is forced to return toward the oil chamber 9 mainly by the "slinger effect", but even at slow speeds, the lubricating oil is forced to return not only by the "slinger effect", but also the throttling or restricting and labyrinth seal effects. Thus the leakage of the lubricating oil into the blower casing 4 can be substantially avoided. Therefore, at higher rotational speeds, an excellent sealing effect can be attained and even at low rotational speeds, a satisfactory sealing effect can be ensured.

What is claimed is:

1. In a turbocharger comprising a casing, operating means such as a turbine and a blower within spaced casing parts respectively, a rotary shaft within the casing on the ends of which the operating means are respectively mounted, spaced bearings for the shaft which are respectively inboard the two operating means, an oil chamber between the bearings, and an oil seal for preventing leakage of oil from the oil chamber to the casing part of an operating means, comprising
  (a). an oil slinger mounted on the shaft between an operating means casing part and the adjacent bearing, and having two axially spaced frustoconical oil slinger surfaces each of which diverges toward the adjacent bearing and the oil chamber, the diameter of the surface adjacent the bearing being greater than that of the surface adjacent the operating means,
  (b). each oil slinger surface having an annular groove,
  (c). two seal plates connected to the casing, each of which is aligned with one of the oil slinger surfaces and has an opening surrounding the surface, the surface defining each opening being parallel to and spaced outwardly from the adjacent frusto-conical surface of the oil slinger, thereby forming between each oil slinger surface and the surrounding seal plate a frusto-conical space which diverges toward the adjacent bearing and the oil chamber, and
  (d). a seal ring mounted on the frusto-conical surrounding surface of each seal plate and positioned within the annular groove in the adjacent oil slinger surface.

* * * * *